United States Patent
Kobayashi et al.

(10) Patent No.: US 11,634,545 B2
(45) Date of Patent: Apr. 25, 2023

(54) LAYERED-SUBSTANCE-CONTAINING SOLUTION AND METHOD OF MANUFACTURING SAME

(71) Applicant: ADEKA CORPORATION, Tokyo (JP)

(72) Inventors: Atsushi Kobayashi, Tokyo (JP); Ryo Taniuchi, Tokyo (JP); Tomoaki Saiki, Tokyo (JP)

(73) Assignee: ADEKA CORPORATION, Tokyo (JP)

(*) Notice: Subject to any disclaimer, the term of this patent is extended or adjusted under 35 U.S.C. 154(b) by 59 days.

(21) Appl. No.: 16/462,981

(22) PCT Filed: Dec. 18, 2017

(86) PCT No.: PCT/JP2017/045271
§ 371 (c)(1),
(2) Date: May 22, 2019

(87) PCT Pub. No.: WO2018/117013
PCT Pub. Date: Jun. 28, 2018

(65) Prior Publication Data
US 2019/0322816 A1 Oct. 24, 2019

(30) Foreign Application Priority Data
Dec. 19, 2016 (JP) .............................. JP2016-245656

(51) Int. Cl.
| | | |
|---|---|---|
| *C08J 3/09* | (2006.01) | |
| *C08J 3/11* | (2006.01) | |
| *C08K 3/04* | (2006.01) | |
| *C08K 3/30* | (2006.01) | |
| *C08K 3/32* | (2006.01) | |
| *C08K 5/521* | (2006.01) | |
| *C08K 7/00* | (2006.01) | |
| *C08K 7/24* | (2006.01) | |
| *C01B 32/225* | (2017.01) | |
| *C08J 3/28* | (2006.01) | |

(52) U.S. Cl.
CPC ............. *C08J 3/097* (2013.01); *C01B 32/225* (2017.08); *C08J 3/096* (2013.01); *C08J 3/11* (2013.01); *C08J 3/28* (2013.01); *C08K 3/04* (2013.01); *C08K 3/30* (2013.01); *C08K 3/32* (2013.01); *C08K 5/521* (2013.01); *C08K 7/00* (2013.01); *C08K 7/24* (2013.01); *C08K 2003/3009* (2013.01); *C08K 2003/324* (2013.01)

(58) Field of Classification Search
CPC .............................. B01B 32/22; B01B 32/225
See application file for complete search history.

(56) References Cited

U.S. PATENT DOCUMENTS

| | | | |
|---|---|---|---|
| 9,764,954 B2 * | 9/2017 | Walters ................ | C01B 32/225 |
| 10,030,155 B2 | 7/2018 | Aida et al. | |
| 2009/0022649 A1 | 1/2009 | Zhamu et al. | |
| 2009/0224211 A1 * | 9/2009 | Storr ....................... | C01B 32/21 |
| | | | 252/502 |
| 2010/0159219 A1 | 6/2010 | Park et al. | |
| 2011/0319554 A1 * | 12/2011 | Frazier .................. | B82Y 40/00 |
| | | | 524/577 |
| 2012/0261612 A1 | 10/2012 | Suh et al. | |
| 2016/0009561 A1 | 1/2016 | Coleman et al. | |
| 2016/0016804 A1 * | 1/2016 | Li ......................... | C01B 32/182 |
| | | | 252/511 |
| 2018/0085730 A1 * | 3/2018 | Kobayashi ............. | B01J 19/129 |

FOREIGN PATENT DOCUMENTS

| | | |
|---|---|---|
| CN | 105121336 A | 12/2015 |
| EP | 2 865 031 A2 | 4/2015 |
| JP | 2009-093186 A | 4/2009 |
| JP | 2012-107233 A | 6/2012 |
| JP | 2012-250883 A | 12/2012 |
| JP | 2013-514963 A | 5/2013 |
| JP | 2016-515090 A | 5/2016 |
| WO | 2013/172350 A1 | 11/2013 |
| WO | WO-2016148252 A1 * | 9/2016 ................ C08J 3/02 |
| WO | WO-2017218547 A1 * | 12/2017 ............... C08K 3/04 |

OTHER PUBLICATIONS

PEG 20000, Wako, 6 pages, Apr. 2021.*
Moosa (Graphene preparation and graphite exfoliation, Turkish Journal of Chemistry, 45, 2021, pp. 493-519).*
Viculis (Intercalation and exfoliation routes to graphite nanoplatelets, Journal of Materials Chemistry, 15, 2005, pp. 974-978).*
Matsumoto (Ultrahigh-throughput exfoliation of graphite into pristine 'single layer' graphene using microwaves and molecularly engineered ionic liquids. Nature Chemistry, vol. 7, 2015, pp. 730-736).*
Mar. 20, 2018 Search Report issued in International Patent Application No. PCT/JP2017/045271.
Radisavljevic et al.; "Single-layer MoS2 transistors;" Nature Nanotechnology; 2011; pp. 147-151; vol. 6.

(Continued)

*Primary Examiner* — Brieann R Johnston

(74) *Attorney, Agent, or Firm* — Oliff PLC

(57) ABSTRACT

A solution is prepared that contains (A) a polymer compound that includes at least one of a hydrolyzable polymer compound or a thermally-decomposable polymer compound, (B) an oxoacid-based compound that includes at least one of a phosphate-based compound, a sulfate-based compound, a sulfonate-based compound, or a perchlorate-based compound, and (C) a laminate of layered substances, and the solution is irradiated with at least one of sonic waves or radio waves, or the solution is heated.

10 Claims, No Drawings

(56) References Cited

OTHER PUBLICATIONS

Jun. 25, 2019 Translation of International Preliminary Report on Patentability issued in International Patent Application No. PCT/JP2017/045271.
Aug. 25, 2020 Extended Search Report issued in European Patent Application No. 17884215.9.

* cited by examiner

LAYERED-SUBSTANCE-CONTAINING SOLUTION AND METHOD OF MANUFACTURING SAME

TECHNICAL FIELD

The present invention relates to a layered-substance-containing solution containing a layered substance and to a method of manufacturing the same.

BACKGROUND ART

A substance (a layered substance) having a layered structure exhibits characteristic physical properties resulting from the layered structure. Many researchers have been therefore conducting research on various layered substances.

For example, a proposal has been made to use a layered substance called a nanosheet to improve performance of electronic devices (for example, refer to Non-patent Literature 1). As the nanosheet, not only a layered substance of a single layer (one-unit layer) but also a layered substance of a multilayer (two to five layers) is used.

The layered substances are generally present in a state in which a plurality of layered substances is laminated (a laminate). Accordingly, in order to peel off the layered substance from the laminate, a method using an adhesive tape, a method using an oxidation method, a method of irradiating the laminate with ultrasonic waves in an organic solvent, etc. have been proposed (for example, refer to Patent Literature 1).

CITATION LIST

Non-Patent Literature

Non-patent Literature 1: B. Radisavljevic et al., Nature Nanotech, 6, pp. 147 to 150, 2011

Patent Literature

Patent Literature 1: International Publication No. 2013/172350 pamphlet

SUMMARY OF INVENTION

As a layered substance is attracting rising attention, it is desired to establish a technique that is able to obtain the layered substance.

It is therefore desirable to provide a layered-substance-containing solution that makes it easier to obtain a layered substance, and a method of manufacturing the layered-substance-containing solution.

As a result of intensive studies to achieve the object mentioned above, the inventors have found out that the foregoing issue is solved by preparing a solution containing a particular kind of polymer compound and an oxoacid-based compound, and irradiating the prepared solution with sonic waves, etc. or heating the prepared solution.

The present invention is based on the foregoing findings. A layered-substance-containing solution according to one embodiment of the present invention includes: (A) a polymer compound that includes at least one of a hydrolyzable polymer compound or a thermally-decomposable polymer compound; (B) an oxoacid-based compound that includes at least one of a phosphoric acid-based compound, a sulfuric acid-based compound, a sulfonic acid-based compound, or a perchloric acid-based compound; and (C) a layered substance.

Moreover, a method of manufacturing a layered-substance-containing solution according to one embodiment of the present invention includes: preparing a solution containing (A) a polymer compound that includes at least one of a hydrolyzable polymer compound or a thermally-decomposable polymer compound, (B) an oxoacid-based compound that includes at least one of a phosphoric acid-based compound, a sulfuric acid-based compound, a sulfonic acid-based compound, or a perchloric acid-based compound, and (C) a laminate of layered substances; and irradiating the solution with at least one of sonic waves or radio waves.

Alternatively, a method of manufacturing a layered-substance-containing solution according to one embodiment of the present invention includes: preparing a solution containing (A) a polymer compound that includes at least one of a hydrolyzable polymer compound or a thermally-decomposable polymer compound, (B) an oxoacid-based compound that includes at least one of a phosphoric acid-based compound, a sulfuric acid-based compound, a sulfonic acid-based compound, or a perchloric acid-based compound, and (C) a laminate of layered substances; and heating the solution.

Herein, the "layered substance" is a layered thin substance. The "layered substance" may include only one kind of element as a constituent element, or may include two or more kinds of elements as constituent elements.

It is to be noted that the "layered substance" may be a single layer or may be a multilayer. In a case where the layered substance is a multilayer, the number of layers of the layered substance is sufficiently small. Specifically, the number of layers of the layered substance is preferably thousand or less. It is to be noted that, in the multilayer layered substance, part of a plurality of layers may include two or more kinds of elements as constituent elements, or all of the layers (each of the layers) may include two or more kinds of elements as constituent elements.

The "laminate of layered substances" is a structure in which a plurality of layered substances is laminated. The number of laminated layered substances is not particularly limited as long as the number of laminated layered substances is two or more.

The "phosphoric acid-based compound" is a generic term for a compound having a phosphate skeleton (a structure in which four oxygen atoms are bonded to a phosphorus atom). The "sulfuric acid-based compound" is a generic term for a compound having a sulfate skeleton (a structure in which four oxygen atoms are bonded to a sulfur atom). The "sulfonic acid-based compound" is a generic term for a compound having a sulfonate skeleton (a structure in which three oxygen atoms and one hydrocarbon group or one halogenated hydrocarbon group are bonded to a sulfur atom). The "perchloric acid-based compound" is a generic term for a compound having a perchlorate skeleton (a structure in which four oxygen atoms are bonded to a chlorine group).

The layered-substance-containing solution according to one embodiment of the present invention contains the polymer compound described above, the oxoacid-based compound described above, and the layered substance. Hence, it is possible to easily obtain the layered substance.

Moreover, according to the method of manufacturing the layered-substance-containing solution of one embodiment of the present invention, the solution containing the polymer compound described above, the oxoacid-based compound described above, and the laminate of the layered substances is irradiated with sonic waves, etc., or heated. Hence, it is possible to easily obtain the layered substance.

MODES FOR CARRYING OUT THE INVENTION

A detailed description is given below of one embodiment of the present invention. An order of the description is as follows. It is to be noted that the details related to the present invention are not limited to embodiments to be described below, and are modifiable as appropriate.
1. Layered-substance-containing Solution
   1-1. Ionic Liquid
      1-1-1. Cation
      1-1-2. Anion
   1-2. Polymer Compound
      1-2-1. Hydrolyzable Polymer Compound
      1-2-2. Thermally-decomposable Polymer Compound
   1-3. Oxoacid-based Compound
      1-3-1. Phosphoric acid-based Compound
      1-3-2. Sulfuric acid-based Compound
      1-3-3. Sulfonic acid-based Compound
      1-3-4. Perchloric acid-based Compound
   1-4. Layered Substance
   1-5. Other Materials
2. Method of Manufacturing Layered-substance-containing Solution
   2-1. Preparation of Layered-substance-containing Solution
   2-2. Purification of Layered-substance-containing Solution
3. Workings and Effects

[1. Layered-Substance-Containing Solution]

First, a description is given of a configuration of a layered-substance-containing solution.

The layered-substance-containing solution contains a polymer compound, an oxoacid-based compound, and a layered substance. It is to be noted that the layered-substance-containing solution may further contain an ionic liquid. In a case where the layered-substance-containing solution contains the ionic liquid, the layered substance is dispersed in the ionic liquid.

[1-1. Ionic Liquid]

The ionic liquid is a liquid salt. The ionic liquid includes a cation and an anion.

The ionic liquid is not particularly limited in its kind, and may be one or more kinds of any ionic liquids.

Details of each of the cation and the anion are as described below. Specifically, the ionic liquid is a compound derived from a combination of one or more kinds of a series of cations described below and one or more kinds of a series of anions described below. It is to be noted that the cation is not limited in its kind to the series of cations described below, and the anion is not limited in its kind to the series of anions described below.

The ionic liquid of the present invention also encompasses a compound that forms a salt in a molecule. Specific examples of such an ionic liquid include (methoxycarbonylsulfamoyl)triethylammonium hydroxide, etc.

One reason why the layered-substance-containing solution includes the ionic liquid is that it is easier for the layered laminate to be dispersed in the ionic liquid in a process of manufacturing the layered-substance-containing solution which will be described later. It is thereby made easier for the layered substance to be peeled off from the layered laminate in the ionic liquid.

A content of the ionic liquid in the layered-substance-containing solution is not particularly limited; however, the content of the ionic liquid in the layered-substance-containing solution is preferably from 5 wt % to 98 wt %, and is more preferably from 25 wt % to 80 wt %. One reason for this is that it is further easier for the layered substance to be peeled off from the layered laminate in the process of manufacturing the layered-substance-containing solution.

[1-1-1. Cation]

The cation includes one or more kinds of any positive ions.

Examples of the cation include an imidazolium-based ion, a pyridinium-based ion, an ammonium-based ion, a pyrrolidinium-based ion, a choline-based ion, a phosphonium-based ion, a sulfonium-based ion, a complex ion thereof, etc.

Specific examples of the imidazolium-based ion include 1-ethyl-3-methylimidazolium, 1-hexyl-3-methylimidazolium, 1-allyl-3-methylimidazolium, 1,2-dimethyl-3-propylimidazolium, 1-butyl-3-methylimidazolium, 1-ethyl-2,3-dimethylimidazolium, 1-butyl-2,3-dimethylimidazolium, 1,3-dimethoxy-2-methylimidazolium, 1-decyl-3-methylimidazolium, 1-(2-hydroxyethyl)-3-methylimidazolium, 1-methyl-3-vinylimidazolium, 1,3-diethoxyimidazolium, 1-benzyl-3-methylimidazolium, 1-ethyl-3-vinylimidazolium, 1-methyl-3-(2',3'-epoxypropyl) imidazolium, 1,3-bis(cyanomethyl) imidazolium, 1,3-bis(3-cyanopropyl) imidazolium, a compound represented by the following Formula (1), etc.

[Chemical Formula 1]

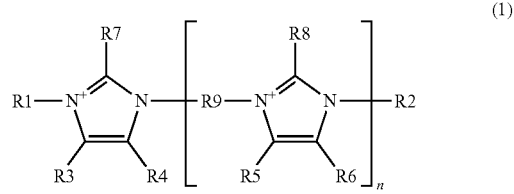

(1)

(Each of R1 and R2 is any of a monovalent unsubstituted hydrocarbon group and a monovalent substituent hydrocarbon group. Each of R3 to R8 is any of a hydrogen group, a monovalent unsubstituted hydrocarbon group, and a monovalent substituent hydrocarbon group. R9 is any of divalent groups represented by the following Formula (2) and the following Formula (3). n is an integer of 0 or greater.)

[Chemical Formula 2]

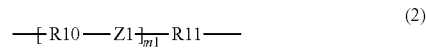

(2)

(Each of R10 and R11 is any of a divalent unsubstituted hydrocarbon group and a divalent substituent hydrocarbon group. Z1 is any of an ether bond (—O—), a sulfide bond (—S—), a divalent unsubstituted aromatic hydrocarbon group, and a divalent substituent aromatic hydrocarbon group. m1 is an integer of 1 or greater.)

[Chemical Formula 3]

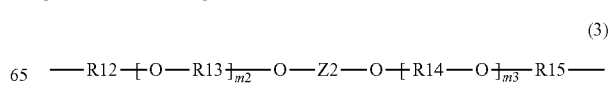

(3)

(Each of R12 to R15 is any of a divalent unsubstituted hydrocarbon group and a divalent substituent hydrocarbon group. Z2 is any of a divalent unsubstituted aromatic hydrocarbon group and a divalent substituent aromatic hydrocarbon group. Each of m2 and m3 is an integer of 1 or greater.)

Each of R1 and R2 is not particularly limited in its kind as long as each of R1 and R2 is any of the monovalent unsubstituted hydrocarbon group and the monovalent substituent hydrocarbon group. Each of the monovalent unsubstituted hydrocarbon group and the monovalent substituent hydrocarbon group may be a straight-chain group or a branched group having one or more side chains. It is to be noted that R1 and R2 may be groups of the same kind or groups of kinds different from each other.

The monovalent unsubstituted hydrocarbon group is a generic term for a monovalent group including carbon and hydrogen. Examples of the monovalent unsubstituted hydrocarbon group include an alkyl group, an alkenyl group, an alkynyl group, a cycloalkyl group, an aryl group, a monovalent group in which two or more kinds of the forgoing groups are bonded, etc.

Specific examples of the alkyl group include a methyl group, an ethyl group, a propyl group, an isopropyl group, a butyl group, an isobutyl group, an s-butyl group, a t-butyl group, an amyl group, an isoamyl group, a t-amyl group, a hexyl group, a heptyl group, etc. Specific examples of the alkenyl group include a vinyl group, an allyl group, etc. Specific examples of the alkynyl group include an ethynyl group, etc. Specific examples of the cycloalkyl group include a cyclopropyl group, a cyclobutyl group, a cyclopentyl group, a cyclohexyl group, a cycloheptyl group, a cyclooctyl group, etc. Specific examples of the aryl group include a phenyl group, a naphthyl group, etc.

The monovalent unsubstituted hydrocarbon group is not particularly limited in its carbon number; however, it is preferable that the carbon number of the monovalent unsubstituted hydrocarbon group not be extremely large. Specifically, the carbon number of each of the alkyl group, the alkenyl group, and the alkynyl group is preferably from 1 to 7. The carbon number of each of the cycloalkyl group and the aryl group is preferably 6 or 7. One reason for this is that dispersibility, etc. of the layered substance are improved thereby.

The monovalent substituent hydrocarbon group is derived from introduction of one or more substituent groups into a monovalent unsubstituted hydrocarbon group. Specifically, the monovalent substituent hydrocarbon group is derived from substitution, by one or more substituent groups, of one or more hydrogen atoms in the monovalent unsubstituted hydrocarbon group. Only one kind of the substituent group may be used, or two or more kinds of the substituent groups may be used.

The substituent group is not particularly limited in its kind. However, examples of the substituent group include a halogen atom, a cyano group (—CN), a nitro group (—NO$_2$), a hydroxyl group (—OH), a thiol group (—SH), a carboxyl group (—COOH), an aldehyde group (—CHO), an amino group (—NR$_2$), a salt thereof, an ester thereof, etc. Examples of the halogen atom include a fluorine atom (F), a chlorine atom (Cl), a bromine atom (Br), an iodine atom (I), etc. Each of the two Rs in the amino group (—NR$_2$) is any of a hydrogen atom and the monovalent unsubstituted hydrocarbon group. The two Rs may be groups of the same kind or groups of kinds different from each other. Details related to the monovalent unsubstituted hydrocarbon group are as described above. It is a matter of course that the kind of the substituent group may be any group other than those described above.

Each of R3 to R8 is not particularly limited in its kind as long as each of R3 to R8 is any of the hydrogen atom, the monovalent unsubstituted hydrocarbon group, and the monovalent substituent hydrocarbon group. R3 to R8 may be groups of the same kind or groups of kinds different from each other. It is a matter of course that some of R3 to R8 may be groups of the same kind. Details related to each of the monovalent unsubstituted hydrocarbon group and the monovalent substituent hydrocarbon group are as described above.

A value of n that determines the number of repeating units is not particularly limited as long as the value of n is an integer of 0 or greater. In other words, the value of n may be 0, or may be an integer of 1 or greater. n is preferably an integer of 30 or smaller, in particular. One reason for this is that dispersibility, etc. of the layered substance are improved thereby.

Each of R7 and R8 is not particularly limited in its kind as long as each of R7 and R8 is any of the hydrogen atom, the monovalent unsubstituted hydrocarbon group, and the monovalent substituent hydrocarbon group. R7 and R8 may be groups of the same kind or groups of kinds different from each other. In a case where a plurality of R8s is included as n is an integer of 2 or greater, some of R7 and R8s may be groups of the same kind. Details of each of the monovalent unsubstituted hydrocarbon group and the monovalent substituent hydrocarbon group are as described above.

In particular, one or more of R7 and R8s are each preferably the monovalent unsubstituted hydrocarbon group. In this case, the number of the monovalent unsubstituted hydrocarbon group may be only one or two or more as long as the monovalent unsubstituted hydrocarbon group is included in R7 and R8s. Specifically, in a case where the plurality of R8s is included, R7 may be the monovalent unsubstituted hydrocarbon group, or one or more of the plurality of R8s may be the monovalent unsubstituted hydrocarbon groups. One reason why one or more of R7 and R8s are the monovalent unsubstituted hydrocarbon groups is that dispersibility, etc. of the layered substance are improved in the case where R7 and R8s include the monovalent unsubstituted hydrocarbon group, compared with a case where R7 and R8s include no monovalent unsubstituted hydrocarbon group.

More specifically, in a case where the value of n is 0, R7 is preferably the monovalent unsubstituted hydrocarbon group. Alternatively, in a case where the value of n is 1 or greater, it is sufficient that one or more of R7 and R8s are the monovalent unsubstituted hydrocarbon groups; however, it is preferable that all of R7 and R8s be the monovalent unsubstituted hydrocarbon groups, in particular. One reason for this is that dispersibility, etc. of the layered substance are improved in any of the foregoing cases.

It is to be noted that the monovalent unsubstituted hydrocarbon group that corresponds to one or more of R7 and R8s is not particularly limited in its kind as long as the monovalent unsubstituted hydrocarbon group that corresponds to one or more of R7 and R8s is any of the foregoing candidates for the monovalent unsubstituted hydrocarbon group. In particular, the monovalent unsubstituted hydrocarbon group is preferably an alkyl group, irrespective of the value of n. One reason for this is that dispersibility, etc. of the layered substance are improved thereby.

R9 may be the divalent group represented by Formula (2), or may be the divalent group represented by Formula (3). In a case where a plurality of R9s is included as n is an integer of 2 or greater, the plurality of R9s may be groups of the same kind or may be groups of kinds different from each other. It is a matter of course that some of the plurality of R9s may be groups of the same kind.

Each of R10 and R11 is not particularly limited in its kind as long as each of R10 and R11 is any of the divalent unsubstituted hydrocarbon group and the divalent substituent hydrocarbon group. Each of the divalent unsubstituted hydrocarbon group and the divalent substituent hydrocarbon group may be a straight-chain group or a branched group having one or more side chains. R10 and R11 may be groups of the same kind or groups of kinds different from each other. In a case where a plurality of R10s is included as m1 is 2 or greater, the plurality of R10s may be groups of the same kind or may be groups of kinds different from each other. It is a matter of course that some of R10s may be groups of the same kind.

The divalent unsubstituted hydrocarbon group is a generic term for a divalent group including carbon and hydrogen. Examples of the divalent unsubstituted hydrocarbon group include an alkylene group, an alkenylene group, an alkynylene group, a cycloalkyl group, an arylene group, a divalent group in which two or more kinds of the foregoing groups are bonded, etc.

Specific examples of the alkylene group include a methane-1,1-diyl group, an ethane-1,2-diyl group, a propane-1,3-diyl group, a butane-1,4-diyl group, an ethane-1,1-diyl group, a propane-1,2-diyl group, a butane-1,2-diyl group, a butane-1,3-diyl group, a butane-2,3-diyl, etc. Specific examples of the alkenylene group include a vinylene group, etc. Specific examples of the alkynylene group include an ethynylene group, etc. Specific examples of the cycloalkylene group include a cyclopropylene group, a cyclobutylene group, etc. Specific examples of the arylene group include a phenylene group, a naphthylene group, etc.

The divalent unsubstituted hydrocarbon group is not particularly limited in its carbon number; however, it is preferable that the carbon number of the divalent unsubstituted hydrocarbon group not be extremely large. Specifically, the carbon number of each of the alkylene group, the alkenylene group, and the alkynylene group is preferably from 1 to 4. The carbon number of each of the cycloalkylene group and the arylene group is preferably 6. One reason for this is that dispersibility, etc. of the layered substance are improved thereby.

The divalent substituent hydrocarbon group is derived from introduction of one or more substituent groups into a divalent unsubstituted hydrocarbon group. It is to be noted that details related to the kind of the substituent group, etc. are as described above.

Z1 is not particularly limited in its kind as long as Z1 is any of the ether bond, the sulfide bond, the divalent unsubstituted aromatic hydrocarbon group, and the divalent substituent aromatic hydrocarbon group. In a case where a plurality of Z1s is included as m1 is 2 or greater, the plurality of Z1s may be groups of the same kind or may be groups of kinds different from each other. It is a matter of course that some of the plurality of Z1s may be groups of the same kind.

The divalent unsubstituted aromatic hydrocarbon group is a generic term for a divalent group including carbon and hydrogen and having a cyclic conjugated structure. Examples of the divalent unsubstituted aromatic hydrocarbon group include an arylene group, etc. Specific examples of the arylene group include a monocyclic phenylene ring, etc. and include a polycyclic naphthylene group, etc.

The divalent unsubstituted aromatic hydrocarbon group has two atomic bondings; however, the positions of the two atomic bondings are not particularly limited. To give an example, in a case where the divalent unsubstituted aromatic hydrocarbon group is a phenylene group, a position of the second atomic bonding with respect to a position of the first atomic bonding may be in an ortho-position, a meta-position, or a para-position. In particular, the position of the second atomic bonding is preferably in the para-position. One reason for this is that chemical stability of the ionic liquid is improved thereby, and dispersibility, etc. are also improved thereby.

The divalent substituent aromatic hydrocarbon group is derived from introduction of one or more substituent groups into a divalent unsubstituted aromatic hydrocarbon group. It is to be noted that details related to the kind of the substituent group, etc. are as described above.

A value of m1 that determines the number of repeating units is not particularly limited as long as the value of m1 is an integer of 1 or greater. m1 is preferably an integer of 30 or smaller, in particular. One reason for this is that dispersibility, etc. of the layered substance are improved thereby.

Each of R12 to R15 is not particularly limited in its kind as long as each of R12 to R15 is any of the divalent unsubstituted hydrocarbon group and the divalent substituent hydrocarbon group. R12 to R15 may be groups of the same kind or groups of kinds different from each other. It is a matter of course that some of R12 to R15 may be groups of the same kind. In a case where a plurality of R13s is included as m2 is an integer of 2 or greater, the plurality of R13s may be groups of the same kind or may be groups of kinds different from each other. Further, some of the plurality of R13s may be groups of the same kind. Similarly, in a case where a plurality of R14s is included as m3 is an integer of 2 or greater, the plurality of R14s may be groups of the same kind or may be groups of kinds different from each other. Further, some of the plurality of R14s may be groups of the same kind. Details of each of the divalent unsubstituted hydrocarbon group and the divalent substituent hydrocarbon group are as described above.

Z2 is not particularly limited in its kind as long as Z2 is any of the divalent unsubstituted aromatic hydrocarbon group and the divalent substituent aromatic hydrocarbon group. Details of each of the divalent unsubstituted aromatic hydrocarbon group and the divalent substituent aromatic hydrocarbon group are as described above.

A value of each of m2 and m3 that determines the number of repeating units is not particularly limited as long as the value of each of m2 and m3 is an integer of 1 or greater. Each of m2 and m3 is preferably an integer of 30 or smaller, in particular. One reason for this is that dispersibility, etc. of the layered substance are improved thereby.

In particular, the cation has a composition that preferably satisfies the following conditions. One reason for this is that synthesis is easily performed and dispersibility, etc. of the layered substance are improved thereby.

Each of R1 and R2 positioned at respective ends is preferably a straight-chain alkyl group. More specifically, each of R1 and R2 positioned at respective ends is preferably a group such as a methyl group, an ethyl group, an n-propyl group, an n-butyl group, an n-pentyl group, or an n-hexyl group. Each of R3 to R6 introduced into each imidazolium ring may be preferably a hydrogen atom. Each of R7 and R8 introduced into each imidazolium ring is preferably a straight-chain alkyl group. More specifically, each of R7 and R8 introduced into each imidazolium ring is preferably a group such as a methyl group, an ethyl group, an n-propyl group, an n-butyl group, an n-pentyl group, or an n-hexyl group. Each of R10 to R15 to be introduced into a group coupling imidazolium rings to each other is preferably a straight-chain alkylene group. More specifically, each of R10 to R15 introduced into a group coupling imidazolium rings to each other is preferably an ethylene group.

A value of n that determines the number of repeating units is preferably an integer from 0 to 2. One reason for this is that the excessively-large value of n increases viscosity of the ionic liquid, which may possibly make it more difficult for the layered substance to be peeled off in a process of manufacturing the layered-substance-containing solution which will be described later. Another reason is that it may be possibly more difficult to perform a purification process of the layered-substance-containing solution in a case where the purification process is necessary.

A value of m1 is preferably an integer from 1 to 5. A value of each of m2 and m3 is preferably 2 or 3.

It is to be noted that any one or more kinds of linking groups described below may be introduced into the foregoing monovalent unsubstituted hydrocarbon group.

The linking group is not particularly limited in its kind as long as the linking group is a divalent group. Specific examples of the linking group include —O—, —C(=O)—, —C(=O)—O—, —O—C(=O)—, —NR—, —S—, etc. R is any of a hydrogen atom and the monovalent unsubstituted hydrocarbon group.

The linking group described here is so introduced to the monovalent unsubstituted hydrocarbon group that a carbon chain is fragmented once or more times. To give an example, introduction of a single ether group into an ethyl group (—CH$_2$—CH$_3$) results in —CH$_2$—O—CH$_3$. To give another example, introduction of two ether groups into a propylene group (—CH$_2$—CH$_2$—CH$_3$) results in —CH$_2$—O—CH$_2$—O—CH$_3$.

This allowance for such introduction of the linking group is also similarly applicable to each of the monovalent substituent hydrocarbon group, the divalent unsubstituted hydrocarbon group, the divalent substituent hydrocarbon group, the divalent unsubstituted aromatic hydrocarbon group, and the divalent substituent aromatic hydrocarbon group.

To give an example, introduction of a single ether group into an ethylene group (—CH$_2$—CH$_2$—) results in —CH$_2$—O—CH$_2$—. To give another example, introduction of two ether groups into a propylene group (—CH$_2$—CH$_2$—CH$_2$—) results in —CH$_2$—O—CH$_2$—O—CH$_2$—.

Specific examples of the pyridinium-based ion include 1-butyl-4-methylpyridinium, 1-butylpyridinium, 1-(3-cyanopropyl)pyridinium, 1-butyl-3-methylpyridinium, etc.

Specific examples of the ammonium-based ion include tetraethylammonium, tetrabutylammonium, tetrahexylammonium, tetraheptylammonium, tetrakis(decyl)ammonium, tetradodecylammonium, tetrahexadecylammonium, triethylmethylammonium, tributylmethylammonium, methyltrioctadecylammonium, trioctylmethylammonium, benzyldimethyltetradecylammonium, tris(2-hydroxyethyl) methylammonium, 2-hydroxyethyltrimethylammonium, etc.

Specific examples of the pyrrolidinium-based ion include 1-butyl-1-methylpyrrolidinium, 1-ethyl-1-methylpyrrolidinium, etc.

Specific examples of the choline-based ion include choline, etc.

Specific examples of the phosphonium-based ion include tetrabutylphosphonium, tributylmethylphosphonium, trihexyltetradecylphosphonium, and 3-(triphenylphosphonio) propane-1-sulfonate, etc.

Specific examples of the sulfonium-based ion include triethylsulfonium, cyclopropyldiphenylsulfonium, etc.

The complex-based ion is an ion that includes one or more kinds of skeletons of the foregoing series of ions (candidates for the cation).

For example, the complex-based ion is an ion that includes a skeleton (an imidazolium skeleton) of the imidazolium-based ion and a skeleton (a pyridinium skeleton) of the pyridinium-based ion. Specific examples of such an ion include the following compound A, etc.

[Chemical Formula 4]

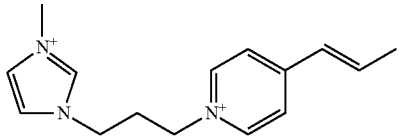

Compound A

In particular, the imidazolium-based ion is preferable. One reason for this is that dispersibility, etc. of the layered substance are improved thereby.

[1-1-2. Anion]

The anion includes one or more kinds of any negative ions.

The negative ion is represented by pAn$^{q-}$, for example. It is to be noted that An$^{q-}$ is a q-valent negative ion. p is a coefficient necessary to maintain neutrality of the ionic liquid as a whole. A value of p is determined depending on the kind of the negative ion. The product (p×q) of p and q is equal to a valence of the cation as a whole.

Examples of a monovalent negative ion include a halogen ion, an inorganic ion, an organic sulfonic acid-based ion, an organic phosphoric acid-based ion, etc.

Specific examples of the halogen ion include a chlorine ion (Cl$^-$), a bromine ion (Br$^-$), an iodine ion (I$^-$), a fluorine ion (F$^-$), etc.

Specific examples of the inorganic ion include a nitrate anion (NO$_3^-$), a perchlorate ion (ClO$_4^-$), a chlorate ion (ClO$_3^-$), a thiocyanate ion (SCN$^-$), a hexafluorophosphate ion (PF$_6^-$), a hexafluoroantimonate ion (SbF$_6^-$), and a boron tetrafluoride ion (BF$_4^-$), a hydrogen sulfonate ion (HSO$_4^-$), etc.

Specific examples of the organic sulfonic acid-based ion include an ethanesulfonate ion, a benzenesulfonate ion, a toluenesulfonate ion, a methanesulfonate ion, a trifluoromethanesulfonate ion, a diphenylamine-4-sulfonate ion, a 2-amino-4-methyl-5-chlorobenzenesulfonate ion, a 2-amino-5-nitrobenzenesulfonate ion, etc. In addition, the organic sulfonic acid-based ion may be any of organic sulfonate ions disclosed in Japanese Unexamined Patent Application Publication No. H8-253705, Japanese Unexamined Patent Application Publication (Japanese Translation of PCT Application) No. 2004-503379, Japanese Unexamined Patent Application Publication No. 2005-336150, International Publication No. 2006/28006, etc.

Specific examples of the organic phosphoric acid-based ion include a dibutyl phosphate ion, an octyl phosphate ion, a dodecyl phosphate ion, an octadecyl phosphate ion, a phenyl phosphate ion, a nonylphenyl phosphate ion, a 2,2'-methylenebis(4,6-di-tert-butylphenyl)phosphonate ion, etc.

In addition, specific examples of the monovalent negative ion include a bis(trifluoromethanesulfonyl) imidate ion (($CF_3SO_2$)$_2$N$^-$), a bis(perfluoroethanesulfonyl) imide ion (($C_2F_5SO_2$)$_2$N$^-$), a bis(perfluorobutanesulfonyl) imide ion (($C_4F_9SO_2$)$_2$N$^-$), a perfluoro-4-ethylcyclohexanesulphonate ion, a tetrakis(pentafluorophenyl) borate ion, a tris(fluoroalkylsulfonyl) carbo ion, dicyanamide, an acetate anion, a trifluoroacetate anion, a dibenzoyl tartrate anion, etc.

Specific examples of the divalent negative ion include a benzenedisulfonate ion, a naphthalenedisulfonate ion, etc.

In particular, the anion is preferably any of the chlorine ion, the bromine ion, the hexafluorophosphate ion, the tetrafluoroborate ion, and the bis(trifluoromethanesulfonyl) imidate ion. One reason for this is that dispersibility, etc. of the layered substance are improved thereby.

Alternatively, the anion is preferably an ion that does not include a bond (a fluorine-containing bond) of the 15 group element of the long form of the periodic table (hereinafter, simply referred to as a "15 group element") and fluorine (F). One reason for this is that it is more difficult for hydrofluoric acid to be generated upon handling the ionic liquid, more specifically, in a process of manufacturing the layered-substance-containing solution. Thereby, the layered substance is dispersed at high concentration in the ionic liquid while safety is secured upon handling of the layered-substance-containing solution. It is to be noted that examples of the 15 group element include phosphorous (P), arsenic (As), antimony (Sb), etc.

In the fluorine-containing bond described here, a fluorine atom is bonded directly to an atom of a 15 group element. Therefore, a case where the fluorine atom is bonded indirectly to the atom of the 15 group element with any one or more atoms in between falls outside the fluorine-containing bond. Specifically, for example, a fluorine-containing bond in a case where the 15 group element is phosphorus is a P—F bond. Further, for example, a fluorine-containing bond in a case where the 15 group element is arsenic is an As—F bond.

In particular, it is preferable that an ion not including the fluorine-containing bond do not include fluorine itself as a constituent element. One reason for this is that it is more difficult for hydrofluoric acid to be generated, which further improves safety upon handling of the layered-substance-containing solution.

[1-2. Polymer Compound]

A polymer compound includes one or both of a hydrolyzable polymer compound and a thermally-decomposable polymer compound. In other words, the polymer compound may include only the hydrolyzable polymer compound, may include only the thermally-decomposable polymer compound, or may include both of the hydrolyzable polymer compound and the thermally-decomposable polymer compound.

One reason why the layered-substance-containing solution includes the polymer compound is that a viscosity of a solution (a layered-laminate-containing solution which will be described later) in which a layered laminate is dispersed is made appropriate in a process of manufacturing the layered-substance-containing solution. Specifically, in a case where the layered-substance-containing solution does not include the polymer compound, the viscosity of the layered-laminate-containing solution in which the layered laminate is dispersed is excessively low. Therefore, it is more difficult to maintain a dispersion state of the layered laminate in the layered-laminate-containing solution. Accordingly, it is more difficult for the layered substance to be peeled off from the layered laminate. In contrast, in a case where the layered-substance-containing solution includes the polymer compound, the viscosity of the layered-laminate-containing solution in which the layered laminate is dispersed is appropriately high. Therefore, it is easier to maintain the dispersion state of the layered laminate in the layered-laminate-containing solution. Accordingly, it is easier for the layered substance to be peeled off from the layered laminate.

[1-2-1. Hydrolyzable Polymer Compound]

The hydrolyzable polymer compound is a polymer compound that has a hydrolyzable group, i.e., a group having a property that causes decomposition as a result of a reaction with water, in its main chain. The hydrolyzable polymer compound includes one or more kinds of hydrolyzable groups. The kind of the hydrolyzable polymer compound may be only a single kind, or may be two or more kinds.

One reason why the polymer compound includes the hydrolyzable polymer compound is that it is more easier for the layered substance to be peeled off from a layered laminate in a process of manufacturing the layered-substance-containing solution, compared with a case where the polymer compound does not include the hydrolyzable polymer compound.

Examples of the hydrolyzable group include an ether bond (—O—), a sulfide bond (—S—), an ester bond (—C(=O)—O—), an amide bond (—C(=O)—NR—), a carbonate bond (—O—C(=O)—O—), a urea bond (—NR—C(=O)—NR—), an imide bond (—C(=O)—NR—C(=O)—), etc., where R is a hydrogen atom or an alkyl group. In a case where the hydrolyzable group includes two Rs, the two Rs may be groups of the same kind as each other or groups of kinds different from each other. It is to be noted that the ether bond encompasses an acetal bond and a glucoside bond in the present invention.

Specific examples of the hydrolyzable polymer compound including a single kind of hydrolyzable group are as follows.

Specific examples of the hydrolyzable polymer compound including the ether bond include polyalkylene glycol (PAG), epoxy resin, etc. Examples of the polyalkylene glycol include polyethylene glycol (PEG), polypropylene glycol (PPG), polytetramethylene glycol, etc.

Further, specific examples of the hydrolyzable polymer compound including the ether bond include an ethylene oxide adduct of a polyol, a propylene oxide adduct of a polyol, etc. Examples of the polyol include glycerin, trimethylolpropane, eythritol, pentaerythritol, diglycerin, sorbitan, sorbitol, glucose, sucrose, N, N, N', N'-tetrakis(2-hydroxyethyl)ethylenediamine, N, N, N', N'-tetrakis(2-hydroxyisopropyl)ethylenediamine, etc.

Specific examples of the hydrolyzable polymer compound including the acetal bond include polyacetal (POM), a polysaccharide derivative, etc. Examples of the polysaccharide derivative include dextrin, pectin, guar gum, methyl cellulose (MC), ethyl cellulose (EC), hydroxyethyl cellulose (HEC), carboxymethyl cellulose (CMC), glucan, carrageenan, etc.

Specific examples of the hydrolyzable polymer compound including the sulfide bond include polythioether, etc. Specific examples of the polythioether include polyphenylene sulfide, polythioether sulfone, etc.

Specific examples of the hydrolyzable polymer compound including the ester bond include a reactant of direct esterification of diacid and a diol compound, a reactant of transesterification of diacid lower alcohol ester and a diol compound, a ring-opening polymer of a lactone polymer, a polymer of hydroxy carboxylic acid, etc. Examples of the diacid include succinic acid, adipic acid, azelaic acid, sebacic acid, dodecanedioic acid, phthalic acid, etc. Examples of the diol compound include ethylene glycol, 1, 2-propanediol, 1, 3-propanediol, diethylene glycol, triethylene glycol, 1, 4-butanediol, neopentyl glycol, 1, 6-hexanediol, 1, 8-octanediol, cyclohexanedimethanol, cyclohexanediol, etc. Examples of the lactone compound include γ-caprolactone, δ-valerolactone, etc. Examples of the hydroxy carboxylic acid include lactic acid, 4-hydroxybutyric acid, 6-hydroxyhexanoic acid, etc.

Specific examples of the hydrolyzable polymer compound including the amide bond include collagen, nylon, derivatives thereof, etc.

Specific examples of the hydrolyzable polymer compound including the carbonate bond include polycarbonate polyol obtained by a condensation reaction of a diol compound and a carbonate compound, etc. Examples of the diol compound include 1, 4-butanediol, 1, 6-hexanediol, ethylene glycol, propylene glycol, 3-methyl-1, 5-pentanediol, neopentyl glycol, diethylene glycol, 1, 4-cyclohexanediol, 1, 4-cyclohexanedimethanol, etc. Examples of the carbonate compound include dimethyl carbonate, diethyl carbonate, ethylene carbonate, etc.

Specific examples of the hydrolyzable polymer compound including the urea bond include polyurea resin, etc.

Specific examples of the hydrolyzable polymer compound including the imide bond include polyimide resin, etc.

The hydrolyzable polymer compound including two kinds of hydrolyzable groups is, for example, a compound involving a combination of two or more kinds of the foregoing series of hydrolyzable polymer compounds each including the single kind of hydrolyzable group. Specific examples of such a compound include polyether polyurethane, polycarbonate polyurethane, polyester polyurethane, polyamide imide, polyether imide, polyether ether ketone, etc.

In particular, the hydrolyzable group is preferably the ether bond and the ester bond, and is more preferably the ether bond. One reason for this is that it is easier for the layered substance to be peeled off from the layered laminate in the process of manufacturing the layered-substance-containing solution.

It is to be noted that the hydrolyzable polymer compound is preferably dispersible or dissolvable in the layered-laminate-containing solution. Further, in a case where the layered-substance-containing solution includes the ionic liquid and another material (a solvent) which will be described later, the hydrolyzable polymer compound is preferably dispersible or dissolvable in the ionic liquid and the solvent.

The hydrolyzable polymer compound is not particularly limited in its molecular weight (the weight-average molecular weight); however, the molecular weight of the hydrolyzable polymer compound is preferably from 600 to 70000, and is more preferably from 2000 to 40000, for example. One reason for this is that it is easier for the hydrolyzable polymer compound to be dispersed or dissolved in the layered-substance-containing solution.

The hydrolyzable polymer compound is not particularly limited in its content in the layered-substance-containing solution; however, the content of the hydrolyzable polymer compound in the layered-substance-containing solution is preferably from 5 wt % to 95 wt %, and is more preferably from 20 wt % to 75 wt %, for example. One reason for this is that it is easier for the layered substance to be peeled off from the layered laminate in the process of manufacturing the layered-substance-containing solution.

[1-2-2. Thermally-Decomposable Polymer Compound]

The thermally-decomposable polymer compound is a polymer compound having a main chain including only a carbon-carbon bond. The thermally-decomposable polymer compound includes one or more kinds of polymer compounds obtained by a reaction related only to a carbon-carbon unsaturated bond and their derivatives.

One reason why the polymer compound includes the thermally-decomposable polymer compound is that it is easier for the layered substance to be peeled off from the layered laminate in the process of manufacturing the layered-substance-containing solution, compared with a case where the polymer compound does not include any thermally-decomposable polymer compound.

The thermally-decomposable polymer compound is a compound (a polymer) that is obtainable by a polymerization reaction using one or more kinds of monomers, for example. The thermally-decomposable polymer compound may be a homopolymer, or may be a copolymer. The monomer is not particularly limited in its kind; however, examples of the monomer include acrylate esters, methacrylate esters, acrylamides, methacrylamides, vinyl esters, styrenes, acrylic acid, methacrylic acid, acrylonitril, maleic anhydride, maleimide, etc.

Specific examples of the acrylic esters include methyl acrylate, ethyl acrylate, n-propyl acrylate, i-propyl acrylate, n-butyl acrylate, i-butyl acrylate, sec-butyl acrylate, t-butyl acrylate, amyl acrylate, 2-ethyl hexyl acrylate, dodecyl acrylate, chloroethyl acrylate, 2-hydroxyethyl acrylate, 2-hydroxypropyl acrylate, 2-hydroxypentyl acrylate, cyclohexyl acrylate, aryl acrylate, trimethylolpropane monoacrylate, pentaerythritol monoacrylate, benzyl acrylate, methoxybenzyl acrylate, chlorobenzyl acrylate, hydroxybenzyl acrylate, hydroxyphenethyl acrylate, dihydroxyphenethyl acrylate, furfuryl acrylate, tetrahydrofurfuryl acrylate, phenyl acrylate, hydroxyphenyl acrylate, chlorophenyl acrylate, surfamoylphenyl acrylate, 2-(hydroxyphenyl carbonyloxy) ethyl acrylate, etc.

Specific examples of the methacrylate esters include methyl methacrylate, ethyl methacrylate, n-propyl methacrylate, i-propyl methacrylate, n-butyl methacrylate, i-butyl methacrylate, sec-butyl methacrylate, t-butyl methacrylate, amyl methacrylate, 2-ethylhexyl methacrylate, dodecyl methacrylate, chloroethyl methacrylate, 2-hydroxyethyl methacrylate, 2-hydroxypropyl methacrylate, 2-hydroxypentyl methacrylate, cyclohexyl methacrylate, aryl methacrylate, trimethylolpropane monomethacrylate, pentaerythritol monomethacrylate, benzyl methacrylate, methoxybenzyl methacrylate, chlorobenzyl methacrylate, hydroxybenzyl methacrylate, hydroxyphenetyl methacrylate, dihydroxyphenetyl methacrylate, furfuryl methacrylate, tetrahydrofurfuryl methacrylate, phenyl methacrylate, hydroxyphenyl methacrylate, chlorophenyl methacrylate, sulfamoylphenyl methacrylate, 2-(hydroxyphenyl carbonyloxy) ethyl methacrylate, etc.

Specific examples of the acrylamides include acrylamide, N-methylacrylamide, N-ethylacrylamide, N-propylacrylamide, N-butylacrylamide, N-benzylacrylamide, N-hydroxyethylacrylamide, N-phenylacrylamide, N-tolylacrylamide, N-(hydroxyphenyl) acrylamide, N-(sulfamoylphenyl) acrylamide, N-(phenylsulfonyl) acrylamide, N-(tolylsulfonyl) acrylamide, N, N-dimethylacrylamide, N-methyl-N-phenylacrylamide, N-hydroxyethyl-N-methylacrylamide, etc.

Specific examples of the methacrylamides include methacrylamide, N-methylmethacrylamide, N-ethylmethacrylamide, N-propylmethacrylamide, N-butylmethacrylamide, N-benzylmethacrylamide, N-hydroxyethylmethacrylamide, N-phenylmethacrylamide, N-tolylmethacrylamide, N-(hydroxyphenyl) methacrylamide, N-(sulfamoylphenyl) methacrylamide, N-(phenylsulfonyl) methacrylamide, N-(tolylsulfonyl) methacrylamide, N, N-dimethylmethacrylamide, N-methyl-N-phenylmethacrylamide, N-hydroxyethyl-N-methylmethacrylamide, etc.

Specific examples of the vinyl esters include vinyl acetate, vinyl butyrate, vinyl benzoate, etc.

Specific examples of the styrenes include styrene, methylstyrene, dimethylstyrene, trimethylstyrene, ethylstyrene, propylstyrene, cyclohexylstyrene, chloromethylstyrene, trifluoromethylstyrene, ethoxymethylstyrene, acetoxymethylstyrene, metoxystyrene, dimetoxystyrene, chlorostyrene, dichlorostyrene, bromostyrene, iodostyrene, fluorostyrene, carboxystyrene, etc.

More specifically, the thermally-decomposable polymer compound is, for example, one or more kinds of vinyl-based resin, acryl-based resin, etc. Examples of the vinyl-based resin include polyvinyl alcohol, polyvinyl acetate, polyvinyl butyral, polyvinyl chloride, etc. Examples of the acryl-based resin include polyacrylic ester, polymethylmethacrylate, etc.

It is to be noted that the thermally-decomposable polymer compound is preferably dispersible or dissolvable in the layered-laminate-containing solution. Further, in a case where the layered-substance-containing solution includes the ionic liquid and another material (a solvent) which will be described later, the thermally-decomposable polymer compound is preferably dispersible or dissolvable in the ionic liquid and the solvent.

The thermally-decomposable polymer compound is not particularly limited in its molecular weight (the weight-average molecular weight); however, the molecular weight of the thermally-decomposable polymer compound is preferably from 600 to 70000, and is more preferably from 2000 to 40000, for example. One reason for this is that it is easier for the thermally-decomposable polymer compound to be dispersed or dissolved in the layered-substance-containing solution.

The thermally-decomposable polymer compound is not particularly limited in its content in the layered-substance-containing solution; however, the content of the thermally-decomposable polymer compound in the layered-substance-containing solution is preferably from 5 wt % to 95 wt %, and is more preferably from 20 wt % to 75 wt %. One reason for this is that it is further easier for the layered substance to be peeled off from the layered laminate in the process of manufacturing the layered-substance-containing solution.

It is to be noted that the polymer compound may include one or more kinds of polymer compounds having properties of the hydrolyzable polymer compound and properties of the thermally-decomposable polymer compound. This polymer compound is a so-called hydrolyzable thermally-decomposable polymer compound.

[1-3. Oxoacid-Based Compound]

The oxoacid-based compound includes one or more kinds of a phosphoric acid-based compound, a sulfuric acid-based compound, a sulfonic acid-based compound, and a perchloric acid-based compound.

One reason why the oxoacid-based compound includes one or more kinds of the phosphoric acid-based compound, the sulfuric acid-based compound, the sulfonic acid-based compound, and the perchloric acid-based compound is that it is easier for the oxoacid-based compound to be intercalated between layers of the layered laminate. This makes it easier for the layered substance to be peeled off from the layered laminate.

It is to be noted that a compound belonging to both the ionic liquid and the oxoacid-based compound is classified as the oxoacid-based compound.

[1-3-1. Phosphoric Acid-Based Compound]

The phosphoric acid-based compound is a generic term for a compound having a phosphate skeleton (a structure in which four oxygen atoms are bonded to a phosphorus atom) as described above.

Specifically, the phosphoric acid-based compound includes, for example, one or more kinds of inorganic phosphate, an alkali metal salt of inorganic phosphate, acid ester phosphate, an alkali metal salt of acid phosphate, triester phosphate, nucleotide, an alkali metal salt of nucleotide, etc. The alkali metal salt is not particularly limited in its kind; however, examples of the alkali metal salt include a lithium salt, a sodium salt, a potassium salt, etc. One reason for this is that it is easier for the oxoacid-based compound (the phosphoric acid-based compound) to be intercalated sufficiently between layers of the layered laminate.

Specific examples of the inorganic phosphate include phosphate, pyrophosphate, triphosphate, etc.

Specific examples of the alkali metal salt of the inorganic phosphate include sodium dihydrogen phosphate, disodium hydrogen phosphate, potassium dihydrogen phosphate, dipotassium hydrogen phosphate, etc.

Specific examples of the acid ester phosphate include monomethyl phosphate, dimethyl phosphate, monoethyl phosphate, diethyl phosphate, monobutyl phosphate, dibutyl phosphate, etc.

Specific examples of the alkali metal salt of the acid phosphate include sodium monomethyl phosphate, sodium dimethyl phosphate, potassium monomethyl phosphate, potassium dimethyl phosphate, sodium monobutyl phosphate, sodium dibutyl phosphate, potassium monobutyl phosphate, potassium dimethyl phosphate, etc.

Specific examples of the triester phosphate include trimethyl phosphate, triethyl phosphate, tributyl phosphate, triphenyl phosphate, etc.

Specific examples of the nucleotide include guanylic acid, inosinic acid, adenosine triphosphate, etc.

Specific examples of the alkali metal salt of the nucleotide include sodium adenosine triphosphate, potassium adenosine triphosphate, etc.

[1-3-2. Sulfuric Acid-Based Compound]

The sulfuric acid-based compound is a generic term for a compound having a sulfate skeleton (a structure in which four oxygen atoms are bonded to a sulfur atom), as described above.

Specifically, the sulfuric acid-based compound includes, for example, one or more kinds of sulfate, sodium hydrogen sulfate, potassium hydrogen sulfate, etc. One reason for this is that it is easier for the oxoacid-based compound (the sulfuric acid-based compound) to be intercalated sufficiently between layers of the layered laminate.

[1-3-3. Sulfonic Acid-Based Compound]

The sulfonic acid-based compound is a generic term for a compound having a sulfonate skeleton (a structure in which three oxygen atoms and one hydrocarbon group or one halogenated hydrocarbon group are bonded to a sulfur atom), as described above.

The "hydrocarbon group" is a generic term for a monovalent group including carbon and hydrogen. Examples of the hydrocarbon group include an alkyl group, a cycloalkyl group, an aryl group, etc. The "halogenated hydrocarbon group" is a group obtained by substituting, by one or more halogen atoms, one or more hydrogen atoms in the hydrocarbon group described above. Examples of the halogen atom include a fluorine atom, a chlorine atom, a bromine atom, an iodine atom, etc. It is to be noted that the carbon number of each of the alkyl group, the cycloalkyl group, and the aryl group is not particularly limited. Further, the kind of the halogen atom may be only a single kind, or may be two or more kinds.

Specifically, the sulfonic acid-based compound includes, for example, one or more kinds of methanesulfonate, trifluoromethanesulfonate, benzenesulfonate, p-toluenesulfonate, etc. One reason for this is that it is easier for the oxoacid-based compound (the sulfonic acid-based compound) to be intercalated sufficiently between layers of the layered laminate.

[1-3-4. Perchloric Acid-Based Compound]

The "perchloric acid-based compound" is a generic term for a compound having a perchlorate skeleton (a structure in which four oxygen atoms are bonded to a chlorine atom), as described above.

Specifically, the perchloric acid-based compound includes, for example, one or more kinds of perchlorate, sodium perchlorate, potassium perchlorate, etc. One reason for this is that it is easier for the oxoacid-based compound (the perchloric acid-based compound) to be intercalated sufficiently between layers of the layered laminate.

One reason why the layered-substance-containing solution includes the oxoacid-based compound is that it is easier for the layered substance to be peeled off from the layered laminate in the process of manufacturing the layered-substance-containing solution. Specifically, in a case where the layered-substance-containing solution does not include any oxoacid-based compound, the oxoacid-based compound is not intercalated between the layers of the layered laminate in the layered-laminate-containing solution. Therefore, it is more difficult for the layered substance to be peeled off from the layered laminate. In contrast, in a case where the layered-substance-containing solution includes the oxoacid-based compound, the oxoacid-based compound is intercalated between the layers of the layered laminate in the layered-laminate-containing solution. Therefore, it is easier for the layered substance to be peeled off from the layered laminate.

The oxoacid-based compound is not particularly limited in its content in the layered-substance-containing solution; however, the content of the oxoacid-based compound in the layered-substance-containing solution is preferably from 0.1 wt % to 20 wt %. One reason for this is that it is easier for the oxoacid-based compound to be intercalated between layers of the layered laminate, and therefore, it is easier for the layered substance to be peeled off from the layered laminate.

[1-4. Layered Substance]

The layered substance is a layered thin substance as described above, and is a so-called nanosheet.

The layered substance is not limited to a single layer, and may be a multilayer as long as the number of layers is sufficiently small. It is to be noted that the layered substance described here is a layered substance that has been peeled off from a laminate in a process of manufacturing the layered-substance-containing solution. The laminate has a multilayer structure in which a plurality of layered substances is laminated. It is to be noted that the kind of the layered substance may be only one kind, or may be two or more kinds.

The layered substance may be a substance (a single-element layered substance) that includes only a single kind of element as a constituent element, or may be a substance (a multiple-element layered substance) that includes two or more kinds of elements as constituent elements. It is to be noted that, in the case of the multiple-element layered substance, part or all of the plurality of layers may include two or more kinds of elements as constituent elements.

The single-element layered substance is not particularly limited in its kind. Examples of the single-element layered substance include graphites, etc. Specific examples of the graphites include natural graphite, expanded graphite, artificial graphite, pyrolytic graphite, etc.

The multiple-element layered substance is not particularly limited in its kind. Examples of the multiple-element layered substance include metal chalcogenide, metal oxide•metal oxyhalide, a metal phosphate salt, clay mineral•silicate salt, double hydroxide, layered titanium oxide, layered perovskite oxide, boron nitrides, etc.

Specific examples of the metal chalcogenide include MX (where M is Ga, Ge, In, etc., and X is S, Se, Te, etc.), $MX_2$ (where M is Ti, Zr, Hf, V, Nb, Ta, Mo, W, etc., and X is S, Se, Te, etc.), and $MPX_3$ (where M is Mg, V, Mn, Fe, Co, Ni, Zn, Cd, In, etc., and X is S, Se, Te, etc.).

Specific examples of the metal oxide•metal oxyhalide include $M_xO_y$ (where M is Ti, Mn, Mo, V, etc.), $MOXO_4$ (where M is Ti, V, Cr, Fe, etc., and X is P, As, etc.), MOX (where M is Ti, V, Cr, Fe, etc., and X is any of Cl, Br, etc.), LnOCl (where Ln is Yb, Er, Tm, etc.), a niobate salt represented by $K[Ca_2Na_{n-3}Nb_nO_{3n+1}]$ (where n satisfies $3 \leq n \leq 7$), a titanate salt, etc. It is to be noted that specific examples of $M_xO_y$ include $MoO_3$, $Mo_{18}O_{52}$, $V_2O_5$, $LiNbO_2$, $Li_xV_3O_8$, etc. Specific examples of the titanate salt include $K_2Ti_4O_9$, $KTiNbO_5$, etc.

Specific examples of the metal phosphate salt include $M(HPO_4)_2$ (where M is Ti, Zr, Ce, Sn, etc.), $Zr(ROPO_3)_2$ (where R is H, Rh, $CH_3$, etc.), etc.

Specific examples of the clay mineral•silicate salt include a smectite group, a kaolin group, pyrophyllite-talc, vermiculite, a mica group, a brittle mica group, a chlorite group, sepiolite-palygorskite, imogolite, allophone, hisingerite, magadiite, kanemite, etc. It is to be noted that specific examples of the smectite group include montmorillonite, saponite, etc. Specific examples of the kaolin group include kaolinite, etc.

Specific examples of the double hydroxide include $[M^{2+}_{1-x}M^{3+}_x(OH)_2][An^-]_{x/n} \cdot zH_2O$ (where $M^{2+}$ is $Mg^{2+}$, $Zn^{2+}$, etc., $M^{3+}$ is $Al^{3+}$, $Fe^{3+}$, etc., and $An^-$ is any anion), etc.

Specific examples of the layered titanium oxide include potassium dititanate ($K_2Ti_2O_5$), potassium tetratitanate ($K_2Ti_4O_9$), etc.

Specific examples of the layered perovskite oxide include $KCa_2Nb_3O_{10}$, $KSr_2Nb_3O_{10}$, $KLaNb_2O_7$, etc.

The boron nitrides is a generic term for a compound including nitrogen (N) and boron (B) as constituent elements. Specific examples of the boron nitrides include boron nitride (BN), boron carbon nitride (BCN), etc.

It is to be noted that the layered substance is not particularly limited in its average particle size; however, in particular, the average particle size of the layered substance is preferably 100 μm or smaller, and more preferably, from 1 μm to 100 μm. One reason for this is that dispersibility, etc. of the layered substance are improved. The average particle size is a so-called median size (D50 corresponding to 50% in a cumulative particle size distribution).

[1-5. Other Materials]

It is to be noted that the layered-substance-containing solution may further contain one or more kinds of other materials.

Examples of the other materials include a solvent (excluding the ionic liquid). Examples of the solvent include an aqueous solvent, an organic solvent, etc. Specific examples of the aqueous solvent include water, ethanol, etc. Specific examples of the organic solvent include dimethyl sulfoxide, ethylene glycol monomethyl ether, diethylene glycol monomethyl ether, triethylene glycol monomethyl ether, ethylene glycol monobutyl ether, diethylene glycol monobutyl ether, propylene glycol monomethyl ether, diproplylene glycol monomethyl ether, ethylene glycol dimethyl ether, diethylene glycol dimethyl ether, triethylene glycol dimethyl ether, trimethyl phosphate, triethyl phosphate, tributyl phosphate, etc.

[2. Method of Manufacturing Layered-Substance-Containing Solution]

Next, a description is given of a method of manufacturing the layered-substance-containing solution described above. It is to be noted that a substance having a multilayer structure in which a plurality of layered substances is laminated is referred to as a "layered laminate" below.

[2-1. Preparation of Layered-Substance-Containing Solution]

In a case of preparing the layered-substance-containing solution, first, a solution (a layered-laminate-containing solution) that contains the polymer compound described above, the oxoacid-based compound described above, and the layered laminate is prepared. The layered-laminate-containing solution may further contain the ionic liquid.

Specifically, for example, the oxoacid-based compound is added to the polymer compound, whereby the oxoacid-based compound is dispersed or dissolved in the polymer compound. In this case, the polymer compound may be stirred on an as-needed basis. Further, one or more kinds of the organic solvents described above may be added to the mixture of the polymer compound and the oxoacid-based compound, on an as-needed basis.

It is to be noted that, for example, in a case where the layered-laminate-containing solution contains the ionic liquid, the polymer compound and the oxoacid-based compound may be added to the ionic liquid, whereby the polymer compound and the oxoacid-based compound may be dispersed or dissolved in the ionic liquid. In this case, the ionic liquid may be stirred on an as-needed basis.

Subsequently, the layered laminate is added to the polymer compound in which the oxoacid-based compound has been dispersed or dissolved, whereby the layered laminate is dispersed in the polymer compound. In this case, the polymer compound may be stirred on an as-needed basis. Thereby, the layered-laminate-containing solution is obtained.

Lastly, the layered-substance-containing solution is manufactured with the use of the layered-laminate-containing solution. In this case, an irradiation method or a heating method is used as a method of peeling the layered substance off from the layered laminate.

In a case where the irradiation method is used as the peeling method, the layered-laminate-containing solution is irradiated with one or both of sonic waves and radio waves. In this case, it is preferable that the layered-laminate-containing solution be irradiated at least with the radio waves. One reason for this is that it is easier for the layered substance to be peeled off from the layered laminate.

The sonic waves are not particularly limited in their kind; however, ultrasonic waves are preferably used in particular. One reason for this is that it is easier for the layered substance to be peeled off from the layered laminate in the layered-laminate-containing solution. In a case where the ultrasonic waves are used, for example, any ultrasonic disperser is allowed to be used; however, a horn-type ultrasonic disperser is preferably used in particular. Conditions of the ultrasonic waves such as frequency, amplitude, or irradiation time are not particularly limited. To give an example, the frequency is from 10 kHz to 1 MHz, and is preferably from 20 kHz to 200 kHz, the amplitude is from 1 μm to 100 μm (a zero-to-peak value), and the irradiation time is 1 minute or more, preferably, from 1 minute to 6 hours.

The radio waves are not particularly limited in their kind; however, microwaves are preferably used in particular. One reason for this is that it is easier for the layered substance to be peeled off from the layered laminate in the layered-laminate-containing solution. In a case where the microwaves are used, any microwave oven is allowed to be used, for example. Conditions of the microwaves such as output, frequency, or irradiation time are not particularly limited. To give an example, the output is 500 W, the frequency is 2.45 GHz, and the irradiation time is 10 seconds or more, preferably, from 10 seconds to 10 minutes. It is to be noted that low-energy microwaves may be used having an output from 1 W to 100 W and the irradiation time from 0.2 hours to 48 hours.

This irradiation process causes, in the layered-laminate-containing solution, one or more layered substances to be peeled from the layered laminate, and causes the one or more layered substances to be dispersed. Thereby, the layered-substance-containing solution is obtained. The layered laminate may remain in the layered-substance-containing solution, or may not remain in the layered-substance-containing solution.

It is to be noted that the peeled amount of the layered substance, i.e., the concentration of the layered-substance-containing solution is controllable in the irradiation process by changing the foregoing irradiation conditions (frequency, etc.). Therefore, the layered-substance-containing solution at high concentration is obtainable by so setting the irradiation conditions that the peeled amount of the layered substance is increased. Specifically, an increase in irradiation time causes an increase in peeled amount of the layered substance, resulting in an increase in concentration of the layered-substance-containing solution. This allows the maximum concentration of the layered-substance-containing solution to be 10 mg/cm$^3$ (=10 mg/ml) or higher, preferably, 20 mg/cm$^3$ (=20 mg/ml) or higher, and more preferably, 40 mg/cm$^3$ (=40 mg/ml) or higher.

In a case of using the heating method as the peeling method, the layered-laminate-containing solution is heated. In this case, the layered-laminate-containing solution is preferably stirred. One reason for this is that it is easier for the layered-laminate-containing solution to be evenly heated.

The heating method is not particularly limited in its details. The heating method may be, for example, a method of directly heating the layered-laminate-containing solution (a direct heating method), or may be a method of indirectly heating the layered-laminate-containing solution (an indirect heating method). In the direct heating method, for example, a heater, etc. is put in a container that contains the layered-laminate-containing solution, and the layered-laminate-containing solution is thereby heated by means of the heater, etc. In the indirect heating method, for example, the container that contains the layered-laminate-containing solution is heated by means of one or more kinds of heating instruments. As the heating instruments, for example, an oil bath, an oven, a hot plate, etc. are allowed to be used. Conditions such as a heating temperature or heating time are not particularly limited. To give an example, the heating temperature is preferably from 70° C. to 300° C., and is more preferably from 100° C. to 200° C. The heating time is preferably from 0.1 hours to 50 hours, and is preferably from 1 hour to 10 hours.

This heating process causes, in the layered-laminate-containing solution, one or more layered substances to be peeled off from the layered laminate, and causes the one or more layered substances to be dispersed. Thereby, the layered-substance-containing solution is obtained. The layered laminate may remain in the layered-substance-containing solution, or may not remain in the layered-substance-containing solution.

[2-2. Purification of Layered-Substance-Containing Solution]

After the preparation of the layered-substance-containing solution, the layered-substance-containing solution may be purified on an as-needed basis.

In a case of purifying the layered-substance-containing solution, for example, the layered substance is purified in an isolated manner by a method such as centrifugation, a Soxhlet method, or cross-flow filtration. It is to be noted that the purification of the layered-substance-containing solution may be performed by any other method.

In particular, the centrifugation is preferable. One reason for this is that it is easier to purify the layered substance in an isolated manner from the layered-substance-containing solution. In this case, for example, any centrifuge is allowed to be used, and any centrifugation condition may be set. The centrifugation process separates the layered-substance-containing solution into a solid phase including the remained layered laminate, an impurity, etc. and a liquid phase (a supernatant liquid) including the layered substance, for example. It is to be noted that, in a case of subjecting the layered-substance-containing solution to centrifugation, only part of the layered-substance-containing solution may be subjected to the centrifugation, or all of the layered-substance-containing solution may be subjected to the centrifugation.

After the centrifugation process, the liquid phase may be collected from the layered-substance-containing solution. The impurities, etc. are thereby removed from the layered-substance-containing solution. The layered-substance-containing solution is therefore purified. In this case, the concentration of the layered-substance-containing solution (purity of the layered substance) is allowed to be prepared by changing the centrifugation conditions.

[3. Workings and Effects]

According to the layered-substance-containing solution and the method of manufacturing the layered-substance-containing solution described above, the layered-laminate-containing solution containing the polymer compound described above, the oxoacid-based compound described above, and the layered laminate is irradiated with sonic waves, etc., or the layered-laminate-containing solution is heated. Thereby, the layered-substance-containing solution is obtained. In this case, the layered substance is easily peeled off from the layered laminate even only with the simple processes that include the preparation process, the irradiation process, and the heating process performed on the layered-laminate-containing solution. This allows for high-concentration dispersion of the layered substance. In addition, the peeling off of the layered substance is stable and highly reproducible. This allows the number of layers of the layered substance to be even. Further, it is difficult for the layered substance to be damaged upon the peeling off.

Therefore, the area of the layered substance is sufficiently great. Hence, it is possible to easily obtain a high-quality layered substance.

In particular, when the layered-laminate-containing solution further contains the ionic liquid, it is further easier for the layered substance to be peeled off from the layered laminate. Therefore, the layered substance is dispersed at higher concentration in the ionic liquid. Accordingly, it is further easier for the layered substance to be peeled off from the layered laminate. Hence, it is possible to obtain a higher effect.

Moreover, when the phosphoric acid-based compound includes inorganic phosphate, etc., the sulfuric acid-based compound includes sulfate, etc., the sulfonic acid-based compound includes methane sulfonate, etc., and the perchloric acid-based compound includes perchlorate, etc., it is easier for the oxoacid-based compound to be intercalated sufficiently between the layers of the layered laminate. Accordingly, it is easier for the layered substance to be sufficiently peeled off from the layered laminate. Hence, it is possible to obtain a higher effect.

Moreover, when the content of the oxoacid-based compound in the layered-substance-containing solution is from 0.1 wt % to 20 wt %, it is further easier for the oxoacid-based compound to be intercalated between the layers of the layered laminate. Accordingly, it is further easier for the laminated substance to be peeled off from the layered laminate. Hence, it is possible to obtain a higher effect.

Moreover, when the polymer compound includes the hydrolyzable polymer compound, and the hydrolyzable polymer compound includes a hydrolyzable group such as an ether bond, it is easier for the layered substance to be peeled off from the layered laminate in response to the irradiation process and the heating process. Hence, it is possible to obtain a higher effect.

Moreover, when the polymer compound includes the thermally-decomposable polymer compound, it is easier for the layered substance to be peeled off from the layered laminate in response to the irradiation process and the heating process. Hence, it is possible to obtain a higher effect.

Moreover, in a case of using the irradiation method, when the ultrasonic waves are used as the sonic waves and the microwaves are used as the radio waves, it is easier for the layered substance to be peeled off from the layered laminate. Hence, it is possible to obtain a higher effect.

WORKING EXAMPLES

A detailed description is given below of working examples of the present invention. An order of the description is as follows. It is to be noted that an embodiment of the present invention is not limited to embodiments to be described below.

1. Manufacturing of Layered-substance-containing Solution
2. Evaluation of Layered-substance-containing Solution

[1. Manufacturing of Layered-Substance-Containing Solution]

Experiment Examples 1 to 93

The layered-substance-containing solution was manufactured by the following procedures. In this case, the irradiation method or the heating method was used as the method of peeling off the layered substance from the layered laminate.

First, a solution (a layered-laminate-containing solution) including the ionic liquid, the polymer compound, the oxoacid-based compound, and the layered laminate was prepared.

In this case, 78.7 parts by mass of the ionic liquid and 21.3 parts by mass of the polymer compound (the hydrolyzable polymer compound or the thermally-decomposable polymer compound) were mixed with each other. Thereafter, the mixture was stirred. Subsequently, the oxoacid-based compound was mixed into the mixture. Thereafter, the mixture was stirred. As a result, the polymer compound and the oxoacid-based compound were dispersed and dissolved in the ionic liquid. Therefore, a mixture solution was obtained.

The kind of the ionic liquid, the kind of the polymer compound, the kind of the oxoacid-based compound, and the content (wt %) of the oxoacid-based compound in the mixture solution were as described in Tables 1 to 6. It is to be noted that, in a case of preparing the layered-laminate-containing solution, on an as-needed basis, the ionic liquid was not used and one of the polymer compound and the oxoacid-based compound was not used. In a case where the ionic liquid was not used, the polymer compound was used in place of the ionic liquid.

As the ionic liquid, the following six kinds of compounds were used.
The following compound 1: bis((trifuluoromethyl)sulfonyl)amide.1-butyl-3-methylimidazolium
The following compound 2: trifluoromethylsulfonate.1-butyl-3-methylimidazolium
The following compound 3: dimethyl phosphate.1, 3-dimethyl imidazolium
The following compound 4: sulfate.1-ethyl-3-methyl imidazolium
The following compound 5: acetate.1-ethyl-3-methyl imidazolium
The following compound 6: bis((trifuluoromethyl)sulfonyl)amide.1, 1'-((ethane-1,2-diylbis(oxy))bis(ethane-2,1-diyl))bis(3-butyl imidazolium)

[Chemical Formula 5]

Compound 1

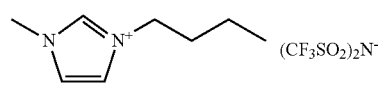

[Chemical Formula 6]

Compound 2

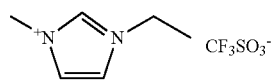

[Chemical Formula 7]

Compound 3

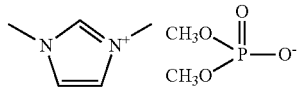

[Chemical Formula 8]

Compound 4

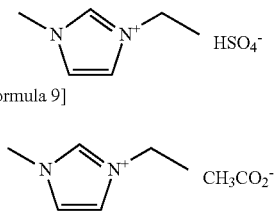

[Chemical Formula 9]

Compound 5

[Chemical Formula 10]

Compound 6

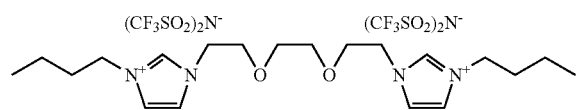

As the polymer compound, the following eleven kinds of compounds were used. It is to be noted that PEG1, PEG2, PEG3, MC, PPG1, PPG2, PAG1, PAG2, and PAG3 described below are the hydrolyzable polymer compounds, and PVA and PA described below are the thermally-decomposable polymer compounds.
PEG1: polyethylene glycol (PEG-20000 manufactured by Wako Pure Chemical Industries, Ltd., weight average molecular weight=about 20000)
PEG2: polyethylene glycol (PEG-2000 manufactured by Wako Pure Chemical Industries, Ltd., weight average molecular weight=about 2000)
PEG3: polyethylene glycol (PEG-600 manufactured by Wako Pure Chemical Industries, Ltd., weight average molecular weight=about 600)
MC: methyl cellulose (10% aqueous solution manufactured by Tokyo Chemical Industry Co., Ltd. (from 90 mPa-s to 110 mPa-s (5%, toluene:ethanol=80:20, 25° C.))
PVA: polyvinyl alcohol (PVA-217 manufactured by Kuraray Co., Ltd.)
PA: acryl-based polymer (ARUFON UP-1000 manufactured by Toagosei Co., Ltd., weight average molecular weight=about 3000)
PPG1: polypropylene glycol (Adeka Polyether P-3000 manufactured by ADEKA Corporation, weight average molecular weight=about 3000)
PPG2: polypropylene glycol (Adeka Polyether P-1000 manufactured by ADEKA Corporation, weight average molecular weight=about 1000)
PAG1: propylene oxide adduct of glycerin (Adeka Polyether G-4000 manufactured by ADEKA Corporation, weight average molecular weight=about 4000)
PAG2: propylene oxide adduct of sucrose (Adeka Polyether SC-1000 manufactured by ADEKA Corporation, weight average molecular weight=about 1000)
PAG3: propylene oxide adduct of sorbitol (Adeka Polyether SP-600 manufactured by ADEKA Corporation, weight average molecular weight=about 600)

As the oxoacid-based compound, the following ten kinds of compounds were used.
phosphate: 90% phosphate manufactured by Wako Pure Chemical Industries, Ltd.
pyrophosphate: diphosphate (containing phosphate) manufactured by Wako Pure Chemical Industries, Ltd.
trimethyl phosphate: manufactured by Wako Pure Chemical Industries, Ltd.
triphenyl phosphate: manufactured by Wako Pure Chemical Industries, Ltd.
monobutyl phosphate: manufactured by Wako Pure Chemical Industries, Ltd.
potassium dihydrogen phosphate: manufactured by Wako Pure Chemical Industries, Ltd.
ATP•Na (adenosine 5'-triphosphate disodium hydrate): manufactured by Tokyo Chemical Industry Co., Ltd.
sulfate: 96% sulfate manufactured by Wako Pure Chemical Industries, Ltd. methane sulfonate: manufactured by Wako Pure Chemical Industries, Ltd.

perchlorate: 60% perchlorate manufactured by Wako Pure Chemical Industries, Ltd.

Subsequently, 25 mg of the layered laminate was mixed into 1 cm$^3$ of the mixture solution. Thereafter, the mixture was grinded by means of a mortar (grinding time=15 minutes). Thereby, the layered laminate was dispersed in the mixture solution. As a result, the layered-laminate-containing solution was obtained.

The kind of the layered laminate was as described in Tables 1 to 6. As the layered laminate, the following seven kinds of substances were used. It is to be noted that 2θ described below indicates a position (a diffraction angle 2θ) of a diffraction peak resulting from the presence of the layered laminate in an analysis result (an XRD chart) obtained by an X-ray diffraction (XRD) method.

natural graphite: manufactured by Wako Pure Chemical Industries, Ltd. (2θ=about 27°)
expanded graphite: EC1500 manufactured by Ito Graphite Co., Ltd. (2θ=about 27°)
SnS$_2$: tin (IV) sulfide manufactured by Mitsuwa Chemicals Co., Ltd. (2θ=about 15°)
MoTe$_2$: molybdenum telluride manufactured by Mitsuwa Chemicals Co., Ltd. (2θ=about 12.6°)
GeS: germanium (II) sulfide manufactured by Mitsuwa Chemicals Co., Ltd. (2θ=about 34.1°)
ZrS$_2$: zirconium sulfide manufactured by Mitsuwa Chemicals Co., Ltd. (2θ=about 15.1°)
NbSe$_2$: niobium selenide manufactured by Mitsuwa Chemicals Co., Ltd. (2θ=about 14°)

TABLE 1

| Experiment example | Layered-laminate-containing solution ||||||| Layered-substance- containing solution Normalized intensity |
|---|---|---|---|---|---|---|---|---|
| | Ionic liquid | Polymer compound || Oxoacid-based compound || Layered laminate | Peeling method | |
| | | Hydrolyzable | Thermally-decomposable | Kind | Content (wt %) | | | |
| 1 | Compound 1 | PEG1 | — | Phosphate | 0.1 | Natural graphite | Irradiation method | 86 |
| 2 | Compound 1 | PEG1 | — | Phosphate | 1 | Natural graphite | Irradiation method | 57 |
| 3 | Compound 1 | PEG1 | — | Phosphate | 3 | Natural graphite | Irradiation method | 37 |
| 4 | Compound 1 | PEG1 | — | Phosphate | 5 | Natural graphite | Irradiation method | 36 |
| 5 | Compound 1 | PEG1 | — | Phosphate | 10 | Natural graphite | Irradiation method | 35 |
| 6 | Compound 1 | PEG1 | — | Phosphate | 20 | Natural graphite | Irradiation method | 75 |
| 7 | Compound 1 | PEG2 | — | Phosphate | 3 | Natural graphite | Irradiation method | 43 |
| 8 | Compound 1 | PEG3 | — | Phosphate | 3 | Natural graphite | Irradiation method | 48 |
| 9 | Compound 2 | PEG1 | — | Phosphate | 3 | Natural graphite | Irradiation method | 38 |
| 10 | Compound 3 | PEG1 | — | Phosphate | 3 | Natural graphite | Irradiation method | 78 |
| 11 | Compound 4 | PEG1 | — | Phosphate | 3 | Natural graphite | Irradiation method | 44 |
| 12 | Compound 5 | PEG1 | — | Phosphate | 3 | Natural graphite | Irradiation method | 51 |
| 13 | Compound 6 | PEG1 | — | Phosphate | 3 | Natural graphite | Irradiation method | 32 |
| 14 | Compound 1 | MC | — | Phosphate | 3 | Natural graphite | Irradiation method | 47 |
| 15 | Compound 1 | — | PVA | Phosphate | 3 | Natural graphite | Irradiation method | 41 |
| 16 | Compound 1 | — | PA | Phosphate | 3 | Natural graphite | Irradiation method | 76 |
| 17 | Compound 1 | PEG1 | — | Pyrophosphate | 1 | Natural graphite | Irradiation method | 56 |

TABLE 2

| Experiment example | Layered-laminate-containing solution ||||||| Layered-substance- containing solution Normalized intensity |
|---|---|---|---|---|---|---|---|---|
| | Ionic liquid | Polymer compound || Oxoacid-based compound || Layered laminate | Peeling method | |
| | | Hydrolyzable | Thermally-decomposable | Kind | Content (wt %) | | | |
| 18 | Compound 1 | PEG1 | — | Pyrophosphate | 3 | Natural graphite | Irradiation method | 58 |
| 19 | Compound 1 | PEG2 | — | Pyrophosphate | 3 | Natural graphite | Irradiation method | 84 |
| 20 | Compound 1 | PEG1 | — | Trimethyl phosphate | 3 | Natural graphite | Irradiation method | 85 |
| 21 | Compound 1 | PEG2 | — | Trimethyl phosphate | 3 | Natural graphite | Irradiation method | 78 |

TABLE 2-continued

| | | Layered-laminate-containing solution | | | | | | Layered-substance - |
|---|---|---|---|---|---|---|---|---|
| | | Polymer compound | | Oxoacid-based compound | | | | |
| Experiment example | Ionic liquid | Hydrolyzable | Thermally-decomposable | Kind | Content (wt %) | Layered laminate | Peeling method | containing solution Normalized intensity |
| 22 | Compound 1 | PEG1 | — | Triphenyl phosphate | 3 | Natural graphite | Irradiation method | 89 |
| 23 | Compound 1 | PEG1 | — | Monobutyl phosphate | 3 | Natural graphite | Irradiation method | 62 |
| 24 | Compound 1 | PEG1 | — | Potassium dihydrogen phosphate | 3 | Natural graphite | Irradiation method | 36 |
| 25 | Compound 1 | PEG2 | — | Potassium dihydrogen phosphate | 3 | Natural graphite | Irradiation method | 46 |
| 26 | Compound 1 | PEG2 | — | ATP-Na | 3 | Natural graphite | Irradiation method | 30 |
| 27 | Compound 1 | PEG1 | — | Phosphate | 3 | Expanded graphite | Irradiation method | 58 |
| 28 | Compound 1 | PEG1 | — | Phosphate | 3 | $SnS_2$ | Irradiation method | 53 |
| 29 | Compound 1 | PEG1 | — | Phosphate | 3 | $MoTe_3$ | Irradiation method | 55 |
| 30 | Compound 1 | PEG1 | — | Phosphate | 3 | GeS | Irradiation method | 21 |
| 31 | Compound 1 | PEG1 | — | Phosphate | 3 | $ZrS2$ | Irradiation method | 37 |
| 32 | Compound 1 | PEG1 | — | Phosphate | 3 | $NbSe2$ | Irradiation method | 46 |
| 33 | Compound 1 | PEG1 | — | Phosphate | 3 | Natural graphite | Heating method | 60 |
| 34 | Compound 1 | PEG2 | — | Phosphate | 3 | Natural graphite | Heating method | 46 |

TABLE 3

| | | Layered-laminate-containing solution | | | | | | Layered-substance - |
|---|---|---|---|---|---|---|---|---|
| | | Polymer compound | | Oxoacid-based compound | | | | |
| Experiment example | Ionic liquid | Hydrolyzable | Thermally-decomposable | Kind | Content (wt %) | Layered laminate | Peeling method | containing solution Normalized intensity |
| 35 | Compound 1 | MC | — | Phosphate | 3 | Natural graphite | Heating method | 54 |
| 36 | Compound 1 | — | PVA | Phosphate | 3 | Natural graphite | Heating method | 52 |
| 37 | Compound 1 | — | PA | Phosphate | 3 | Natural graphite | Heating method | 61 |
| 38 | Compound 1 | PEG1 | — | Sulfate | 3 | Natural graphite | Irradiation method | 39 |
| 39 | Compound 1 | PEG1 | — | Methane sulfonate | 3 | Natural graphite | Irradiation method | 43 |
| 40 | Compound 1 | PEG1 | — | Perchlorate | 3 | Natural graphite | Irradiation method | 41 |
| 41 | Compound 1 | PPG1 | — | Phosphate | 3 | Natural graphite | Irradiation method | 37 |
| 42 | Compound 1 | PPG1 | — | Sulfate | 3 | Natural graphite | Irradiation method | 38 |
| 43 | Compound 1 | PPG2 | — | Sulfate | 3 | Natural graphite | Irradiation method | 59 |
| 44 | Compound 1 | PEG1 | — | Sulfate | 3 | Natural graphite | Heating method | 49 |
| 45 | Compound 1 | PEG1 | — | Methane sulfonate | 3 | Natural graphite | Heating method | 49 |
| 46 | Compound 1 | PEG1 | — | Perchlorate | 3 | Natural graphite | Heating method | 49 |
| 47 | Compound 1 | PPG1 | — | Phosphate | 3 | Natural graphite | Heating method | 43 |
| 48 | Compound 1 | PPG1 | — | Sulfate | 3 | Natural graphite | Heating method | 41 |

TABLE 4

| Experiment example | Layered-laminate-containing solution | | | | | | | Layered-substance-containing solution Normalized intensity |
|---|---|---|---|---|---|---|---|---|
| | Ionic liquid | Polymer compound | | Oxoacid-based compound | | Layered laminate | Peeling method | |
| | | Hydrolyzable | Thermally-decomposable | Kind | Content (wt %) | | | |
| 49 | Compound 1 | PAG1 | — | Phosphate | 3 | Natural graphite | Irradiation method | 14 |
| 50 | Compound 1 | PAG1 | — | Phosphate | 3 | Natural graphite | Heating method | 13 |
| 51 | Compound 4 | PAG1 | — | Sulfate | 3 | Natural graphite | Irradiation method | 10 |
| 52 | Compound 4 | PAG2 | — | Sulfate | 3 | Natural graphite | Irradiation method | 11 |
| 53 | Compound 4 | PAG3 | — | Sulfate | 3 | Natural graphite | Irradiation method | 45 |
| 54 | Compound 4 | PAG1 | — | Sulfate | 3 | Natural graphite | Heating method | 12 |
| 55 | Compound 4 | PAG2 | — | Sulfate | 3 | Natural graphite | Heating method | 14 |
| 56 | Compound 4 | PAG3 | — | Sulfate | 3 | Natural graphite | Heating method | 50 |
| 57 | — | PEG1 | — | Phosphate | 3 | Natural graphite | Irradiation method | 53 |
| 58 | — | PEG2 | — | Phosphate | 3 | Natural graphite | Irradiation method | 48 |
| 59 | — | MC | — | Sulfate | 3 | Natural graphite | Irradiation method | 56 |
| 60 | — | — | PVA | Phosphate | 3 | Natural graphite | Irradiation method | 56 |
| 61 | — | PPG2 | — | Phosphate | 3 | Natural graphite | Irradiation method | 49 |
| 62 | — | PPG2 | — | Sulfate | 3 | Natural graphite | Irradiation method | 51 |

TABLE 5

| Experiment example | Layered-laminate-containing solution | | | | | | | Layered-substance-containing solution Normalized intensity |
|---|---|---|---|---|---|---|---|---|
| | Ionic liquid | Polymer compound | | Oxoacid-based compound | | Layered laminate | Peeling method | |
| | | Hydrolyzable | Thermally-decomposable | Kind | Content (wt %) | | | |
| 63 | — | PAG1 | — | Sulfate | 3 | Natural graphite | Irradiation method | 45 |
| 64 | — | PAG2 | — | Sulfate | 3 | Natural graphite | Irradiation method | 42 |
| 65 | — | PEG1 | — | Sulfate | 3 | Natural graphite | Heating method | 57 |
| 66 | — | MC | — | Phosphate | 3 | Natural graphite | Heating method | 56 |
| 67 | — | — | PVA | Sulfate | 3 | Natural graphite | Heating method | 56 |
| 68 | — | PPG2 | — | Phosphate | 3 | Natural graphite | Heating method | 56 |
| 69 | — | PPG2 | — | Sulfate | 3 | Natural graphite | Heating method | 53 |
| 70 | — | PAG1 | — | Sulfate | 3 | Natural graphite | Heating method | 46 |
| 71 | — | PAG2 | — | Sulfate | 3 | Natural graphite | Heating method | 44 |
| 72 | Compound 1 | PEG1 | — | — | — | Natural graphite | Irradiation method | 95 |
| 73 | Compound 1 | PEG2 | — | — | — | Natural graphite | Irradiation method | 95 |
| 74 | Compound 1 | PEG3 | — | — | — | Natural graphite | Irradiation method | 96 |
| 75 | Compound 1 | MC | — | — | — | Natural graphite | Irradiation method | 98 |
| 76 | Compound 1 | PPG1 | — | — | — | Natural graphite | Irradiation method | 100 |

TABLE 6

| | | Layered-laminate-containing solution | | | | | | Layered-substance - |
| | | Polymer compound | | Oxoacid-based-compound | | | | containing solution |
| Experiment example | Ionic liquid | Hydrolyzable | Thermally-decomposable | Kind | Content (wt %) | Layered laminate | Peeling method | Normalized intensity |
|---|---|---|---|---|---|---|---|---|
| 77 | Compound 1 | PPG2 | — | — | — | Natural graphite | Irradiation method | 100 |
| 78 | Compound 1 | — | PVA | — | — | Natural graphite | Irradiation method | 99 |
| 79 | Compound 1 | — | PA | — | — | Natural graphite | Irradiation method | 99 |
| 80 | Compound 1 | — | — | Phosphate | 3 | Natural graphite | Irradiation method | 100 |
| 81 | Compound 1 | — | — | Sulfate | 3 | Natural graphite | Irradiation method | 100 |
| 82 | Compound 1 | — | — | Methane sulfonate | 3 | Natural graphite | Irradiation method | 100 |
| 83 | Compound 1 | — | — | Perchlorate | 3 | Natural graphite | Irradiation method | 100 |
| 84 | Compound 1 | PEG1 | — | — | — | Natural graphite | Heating method | 95 |
| 85 | Compound 1 | PEG2 | — | — | — | Natural graphite | Heating method | 96 |
| 86 | Compound 1 | MC | — | — | — | Natural graphite | Heating method | 98 |
| 87 | Compound 1 | PPG1 | — | — | — | Natural graphite | Heating method | 100 |
| 88 | Compound 1 | — | PVA | — | — | Natural graphite | Heating method | 97 |
| 89 | Compound 1 | — | PA | — | — | Natural graphite | Heating method | 98 |
| 90 | Compound 1 | — | — | Phosphate | 3 | Natural graphite | Heating method | 100 |
| 91 | Compound 1 | — | — | Sulfate | 3 | Natural graphite | Heating method | 100 |
| 92 | Compound 1 | — | — | Methane sulfonate | 3 | Natural graphite | Heating method | 100 |
| 93 | Compound 1 | — | — | Perchlorate | 3 | Natural graphite | Heating method | 100 |

After preparing the layered-laminate-containing solution, the layered-substance-containing solution was manufactured with the use of the layered-laminate-containing solution. The kind of the peeling method is as described in Tables 1 to 6.

In a case of using the irradiation method as the peeling method, the layered-laminate-containing solution (0.60 g) was collected in a vial (0.5 cm$^3$=0.5 ml) for a microwave synthesis device (Initiator$^+$ manufactured by Biotage Japan Ltd.). Thereafter, the vial was sealed. Thereafter, the layered-laminate-containing solution was subjected to irradiation by means of the microwave synthesis device (temperature=150° C., irradiation time=30 minutes). Thereby, the layered-substance-containing solution was obtained.

In a case of using the heating method as the peeling method, the layered-laminate-containing solution (5 cm$^3$=5 ml) was collected in an eggplant flask. Thereafter, the eggplant flask was heated (6 hours) by means of an oil bath (130° C.) while stirring the oil. Thereby, the layered-substance-containing solution was obtained.

[2. Evaluation of Layered-Substance-Containing Solution]

The layered-substance-containing solution was analyzed by an XRD method (a concentration method). In this case, the layered-substance-containing solution was applied to a surface of a sample plate to fabricate a sample for analysis.

As an analysis result (an XRD chart) obtained by the XRD method, a diffraction peak resulting from the presence of the layered laminate was detected in the vicinity of the foregoing value of 20.

The intensity of the diffraction peak was examined on the basis of the XRD chart, and results described in Tables 1 to 6 were obtained thereby. In this case, a converted value of intensity (normalized intensity) of the diffraction peak was calculated on the basis of the intensity of diffraction peak in a case where the layered-laminate-containing solution did not include the polymer compound and included only the oxoacid-based compound (Experiment examples 80 to 83 and 90 to 93) as 100.

As described in Tables 1 to 6, the tendency that the layered substance is peeled off from the layered laminate in the layered-laminate-containing solution varied in accordance with the composition of the layered-laminate-containing solution.

Specifically, in a case where the layered-laminate-containing solution included only the polymer compound and did not include the oxoacid-based compound (Experiment examples 72 to 79 and 84 to 89), the normalized intensity was slightly decreased. In other words, even when the layered-laminate-containing solution was subjected to the irradiation process or the heating process, little layered substance was peeled off from the layered laminate.

In contrast, in a case where the layered-laminate-containing solution included the polymer compound and the oxoacid-based compound (Experiment examples 1 to 71), the normalized intensity was greatly decreased independently of presence or absence of the ionic liquid, the kind of the ionic liquid, the kind of the polymer compound, the kind of the oxoacid-based compound, and the kind of the peeling method. This result indicates that the intensity of the peak resulting from the presence of the layered laminate was decreased by subjecting the layered-laminate-containing solution to the irradiation process or the heating process. In other words, a great amount of layered substances were peeled off from the layered laminate in the layered-laminate-containing solution.

In this case, in particular, when the layered-laminate-containing solution includes the ionic liquid, the normalized intensity was further decreased. Further, when the content of the oxoacid-based compound in the layered-substance-containing solution was from 0.1 wt % to 20 wt %, the layered substance was sufficiently peeled off from the layered laminate.

It is to be noted that specific verification was not conducted for a case in which two kinds of oxoacid-based compounds were used in combination. However, as described above, it was easier for the layered substance to be peeled off from the layered laminate in a case where a particular kind of oxoacid-based compound (for example, phosphate) was used. Further, it was easier for the layered substance to be peeled off from the layered laminate also in a case where another kind of oxoacid-based compound (for example, pyrophosphate) was used. In addition, taking into consideration the tendency that it was easier for the layered substance to be peeled off from the layered laminate in the case where the oxoacid-based compound was used, it is difficult to think of a particular reason which makes it more difficult for the layered substance to be peeled off from the layered laminate in a case where two kinds of oxoacid-based compounds are used in combination. Accordingly, it should be easier for the layered substance to be peeled off from the layered laminate also in the case where two kinds of oxoacid-based compounds are used in combination. It is a matter of course that it can be considered that it is easier for the layered substance to be peeled off from the layered laminate in a similar manner also in a case where three or more kinds of oxoacid-based compounds are used.

According to the results described above, the layered substance was easily obtained by irradiating, with radio waves, etc., the layered-laminate-containing solution containing the polymer compound described above, the oxoacid-based compound described above, and the layered laminate, or by heating the layered-laminate-containing solution.

The present invention has been described above with reference to the embodiments and the working examples: however, the present invention is not limited to the examples described in the embodiments and the working examples, and may be modified in a variety of ways.

The present application is based on and claims priority from Japanese Patent Application No. 2016-245656 filed with the Japan Patent Office on Dec. 19, 2016, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A method of manufacturing a layered-substance-containing solution, the method comprising:
    preparing a solution containing (A) a polymer compound that includes a hydrolyzable polymer compound, (B) an oxoacid-based compound that includes at least one of a phosphoric acid-based compound, a sulfuric acid-based compound, a sulfonic acid-based compound, or a perchloric acid-based compound, and (C) a laminate of layered substances; and
    irradiating the solution with radio waves to cause one or more layered substances to be peeled from the laminate of layered substances, wherein
    the phosphoric acid-based compound includes at least one of inorganic phosphoric acid, an alkali metal salt of inorganic phosphate, acid ester phosphate, an alkali metal salt of acid phosphate, triester phosphate, nucleotide, or an alkali metal salt of nucleotide;
    the sulfuric acid-based compound includes at least one of a sulfate, a sodium hydrogen sulfate, or a potassium hydrogen sulfate;
    the sulfonic acid-based compound includes at least one of methanesulfonate, trifluoromethanesulfonate, benzenesulfonate, or p-toluenesulfonate; and
    the perchloric acid-based compound includes at least one of a perchlorate, sodium perchlorate, or potassium perchlorate, wherein
    a content of the oxoacid-based compound is equal to or greater than 0.1 weight percent and equal to or smaller than 20 weight percent, and wherein
    the hydrolyzable polymer compound includes at least one of an ether bond, a sulfide bond, an ester bond, an amide bond, a carbonate bond, a urea bond, or an imide bond.

2. A method of manufacturing a layered-substance-containing solution, the method comprising:
    preparing a solution containing (A) a polymer compound that includes a hydrolyzable polymer compound, (B) an oxoacid-based compound that includes at least one of a phosphoric acid-based compound, a sulfuric acid-based compound, a sulfonic acid-based compound, or a perchloric acid-based compound, and (C) a laminate of layered substances; and
    heating the solution at a temperature in a range from 70° C. to 300° C. to cause one or more layered substances to be peeled from the laminate of layered substances, wherein
    the phosphoric acid-based compound includes at least one of inorganic phosphoric acid, an alkali metal salt of inorganic phosphate, acid ester phosphate, an alkali metal salt of acid phosphate, triester phosphate, nucleotide, or an alkali metal salt of nucleotide;
    the sulfuric acid-based compound includes at least one of a sulfate, a sodium hydrogen sulfate, or a potassium hydrogen sulfate;
    the sulfonic acid-based compound includes at least one of methanesulfonate, trifluoromethanesulfonate, benzenesulfonate, or p-toluenesulfonate; and
    the perchloric acid-based compound includes at least one of a perchlorate, sodium perchlorate, or potassium perchlorate, wherein
    a content of the oxoacid-based compound is equal to or greater than 0.1 weight percent and equal to or smaller than 20 weight percent, and wherein
    the hydrolyzable polymer compound includes at least one of an ether bond, a sulfide bond, an ester bond, an amide bond, a carbonate bond, a urea bond, or an imide bond.

3. The method of manufacturing the layered-substance-containing solution according to claim 1, wherein the oxoacid-based compound includes at least the phosphoric acid-based compound.

4. The method of manufacturing the layered-substance-containing solution according to claim 1, wherein the oxoacid-based compound includes at least the sulfuric acid-based compound.

5. The method of manufacturing the layered-substance-containing solution according to claim 1, wherein the oxoacid-based compound includes at least the sulfonic acid-based compound.

6. The method of manufacturing the layered-substance-containing solution according to claim 1, wherein the oxoacid-based compound includes at least the perchloric acid-based compound.

7. The method of manufacturing the layered-substance-containing solution according to claim 2, wherein the oxoacid-based compound includes at least the phosphoric acid-based compound.

8. The method of manufacturing the layered-substance-containing solution according to claim 2, wherein the oxoacid-based compound includes at least the sulfuric acid-based compound.

9. The method of manufacturing the layered-substance-containing solution according to claim 2, wherein the oxoacid-based compound includes at least the sulfonic acid-based compound.

10. The method of manufacturing the layered-substance-containing solution according to claim 2, wherein the oxoacid-based compound includes at least the perchloric acid-based compound.

* * * * *